(12) United States Patent
Wolf et al.

(10) Patent No.: US 6,412,180 B1
(45) Date of Patent: Jul. 2, 2002

(54) ANTI-VIBRATION ELEMENT HAVING SEPARATION SECUREMENT

(75) Inventors: Günter Wolf, Oppenweiler; Savino Petruzzelli, Marbach, both of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/631,850

(22) Filed: Aug. 3, 2000

(30) Foreign Application Priority Data

Aug. 3, 1999 (DE) .......................................... 199 35 609

(51) Int. Cl.[7] ................................ F16F 1/36; B25F 5/02
(52) U.S. Cl. ......................................... 30/381; 173/162.2
(58) Field of Search .......................... 30/381, 383, 382, 30/384; 173/162.2, 162.1; 267/137, 153, 269

(56) References Cited

U.S. PATENT DOCUMENTS

| 4,670,985 A | 6/1987 | Biersteker | 30/381 |
| 4,896,426 A | 1/1990 | Nagashima | 30/383 |
| 5,046,566 A | * 9/1991 | Dorner et al. | 173/162.2 |
| 5,699,865 A | * 12/1997 | Forderer et al. | 173/162.2 |

FOREIGN PATENT DOCUMENTS

DE      195 30 712 A1     2/1997

* cited by examiner

*Primary Examiner*—Hwei-Siu Payer
(74) *Attorney, Agent, or Firm*—R. W. Becker & Associates; R. W. Becker

(57) ABSTRACT

An anti-vibration element is provided for disposition between a motor unit and a handle unit of a manually guided implement. The anti-vibration element includes a sleeve-shaped, elastic main body as a vibration damper, with one end portion of the main body being adapted to be disposed in a receiving recess of the motor unit, and the other end portion being adapted to be disposed in a receiving recess of the handle unit. Respective plugs are disposed in the end portions of the main body for non-detachably holding such end portions in the receiving recesses. A cable that serves as a coupling element for preventing separation of the plugs is provided and spans an axial spacing between the plugs and extends through the main body. Each of the end regions of the cable has a respective fitting, an axially inwardly facing end face of each such fitting positively engaging behind an edge of an adjacent one of the handle unit and the motor unit.

20 Claims, 5 Drawing Sheets

ANTI-VIBRATION ELEMENT HAVING SEPARATION SECUREMENT

BACKGROUND OF THE INVENTION

The present invention relates to an anti-vibration element between a motor unit and a handle unit of a manually guided implement, especially a power chain saw, a disk cutter or cut-off saw, a blower unit, or the like.

DE 195 30 712 A1 discloses an effective anti-vibration element that comprises an elastic main body, the ends of which are disposed in appropriate receiving means of the motor unit and of the handle unit. To secure the position of the end portions in the receiving means, respective plugs are pressed into the tubular main body. These effective, easy to assemble anti-vibration elements are furthermore provided with a separation securement that establishes a mechanical connection between the plugs in the event that the elastic main body is destroyed. For this purpose, a rod-like coupling element is disposed on one of the plugs; the head of this coupling element has a T-shaped configuration. An engagement slot is associated with this head in the other, opposite plug, whereby during assembly care must be taken that the T-shaped head enters the slot of the opposite plug. By rotating the plugs by 90° relative to one another, an axially positive connection is established that becomes effective upon destruction of the elastic main body of the anti-vibration element.

Although this known separation securement has proven satisfactory in practice, it requires during assembly a precise orientation of the plugs relative to one another, whereby to avoid assembly errors precise assembly instructions must be followed. Especially in the case of mass production, this is very time consuming and hence expensive.

It is therefore an object of the present invention to provide an anti-vibration element having an easy to assemble, effective separation securement.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
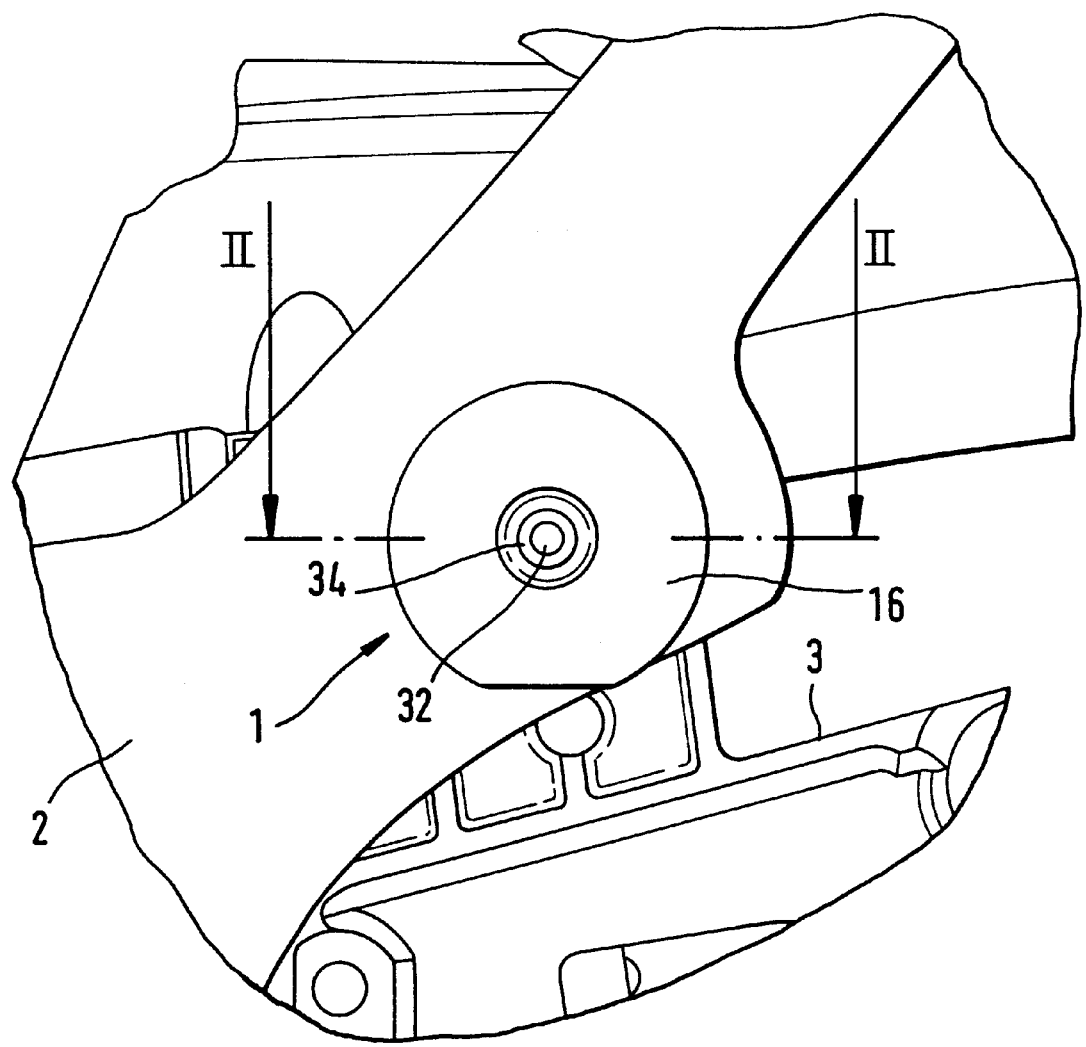
FIG. 1 is a partial view showing the arrangement of one exemplary embodiment of an inventive anti-vibration element disposed between a motor unit and a handle or housing unit.

The anti-vibration element of the present invention includes a sleeve-like elastic main body as a vibration dampener, wherein a first end portion of the main body is adapted to be disposed in a receiving means of the motor unit, and a second end portion of the main body is adapted to be disposed in a receiving means of the handle unit; respective plugs disposed in the end portions of the main body for non-detachably holding such end portions in the receiving means; and a cable that serves as a coupling element for preventing separation of the plugs, wherein the cable spans an axial spacing between the plugs and extends through the main body, wherein the cable has two end regions, each of which is provided with a respective fitting, and wherein an axially inwardly facing end face of each of the fittings positively engages behind an edge of an adjacent one of the handle unit and the motor unit.

Embodying the coupling element as a cable enables a simple assembly that can be easily visually monitored and can be carried out with very simple means. By having the fittings of the cable engage behind associated edges, an axially positive connection is provided that with an intact anti-vibration element essentially transfers no vibrations from the motor unit to the handle unit.

The length of the cable is greater than the spacing of the edges of the units that are engaged from behind and are disposed between the fittings, so that even in an axial direction a direct contact of the handle unit and of the motor unit is reliably prevented.

Pursuant to one preferred specific embodiment, the cable is embodied as a shear-resistant cable, especially a steel cable, that is rigid for pushing purposes and as a result of which the separation securement can be axially inserted into appropriate assembly openings in the manner of a screw or bolt. Additional guidance measures or introduction aids, as would be required for limp or easily bendable cables are eliminated.

The plugs preferably have a through bore through which the smaller diameter fittings at the end of the cable can be inserted. In this connection, it is expedient to positively fix the fittings that are inserted through the anti-vibration element into position on the edge of the housing of the unit, preferably the motor unit, by means of a clip. Such a clip also makes it easily possible to orient the cable approximately centrally in the through bores of the plugs. It can be expedient to fix the fitting inserted through the anti-vibration element in position directly in a receiving means of the housing wall of the unit, preferably the motor unit.

The first fitting, which has a larger outer diameter, is disposed with slight radial play in a cylindrical receiving section of the first plug, whereby its end face is disposed across from an edge of the through bore as an abutment surface.

Further specific features of the present invention will be described in detail subsequently.

DESCRIPTION OF PREFERRED EMBODIMENTS

Referring now to the drawings in detail, the anti-vibration element 1 shown in the illustrated embodiment is disposed between a handle unit 2 and a motor unit 3 of a manually guided implement, such as a power chain saw, a disk cutter or cut-off saw, a blower unit, or the like. As can be seen in particular from the cross-sectional views of FIGS. 2, 3 and 7, the anti-vibration element 1 comprises a main body 5 that forms the vibration damper 4 and that is made of an elastomeric material such as rubber, polymeric material, or the like; the main body 5 has a sleeve-like or tubular configuration. The vibration damper 4 of the anti-vibration element 1 connects the handle unit 2, for example a handle, with the motor unit 3, i.e., the housing 6 that holds the drive motor. For this purpose, a respective receiving means 9 and 10 is provided in each of the housing portion 7 of the motor unit 3 and in the handle portion 8 of the handle unit 2.

The receiving means 10 in the handle portion 8 of the handle unit 2 is essentially embodied as a continuous opening or through bore. At that end thereof that faces the motor unit 3, there is provided an inner, circumferential mounting rib 12 with which is associated an outer, circumferential mounting groove 14 that is formed in the end portion 50 of the main body 5. The receiving recess 9 in the housing portion 7 of the motor unit 3 is embodied in a similar manner; in particular, the receiving recess 9, as is the receiving recess 10 in the handle portion 8, is cylindrical and is provided on that end that faces the handle unit 2 with a mounting rib 11 with which is associated an outer, circumferential mounting groove 13 in the end portion 55 of the main body 5.

If the end portions 50 and 55 of the main body 5 are disposed in the proper position in the receiving recesses 9 and 10 of the motor unit 3 and the handle unit 2 respectively, inserts or plugs 15 and 16 are axially pressed into the end portions 50 and 55 of the main body 5 as a result of which each end portion 50 and 55 is non-detachably secured in its respective recess. In so doing, the plug 16 that engages in the end portion 50 closes off the recess 10 of the handle portion 8 in a lid-like manner, and the outer annular flange 17 of the plug 16 rests against the adjacent edge 19 of the recess 10.

On that side remote from the handle portion 8, about half the height of the cross-section of the recess 9 is closed off by a wall 18 of the housing.

Figure 2:
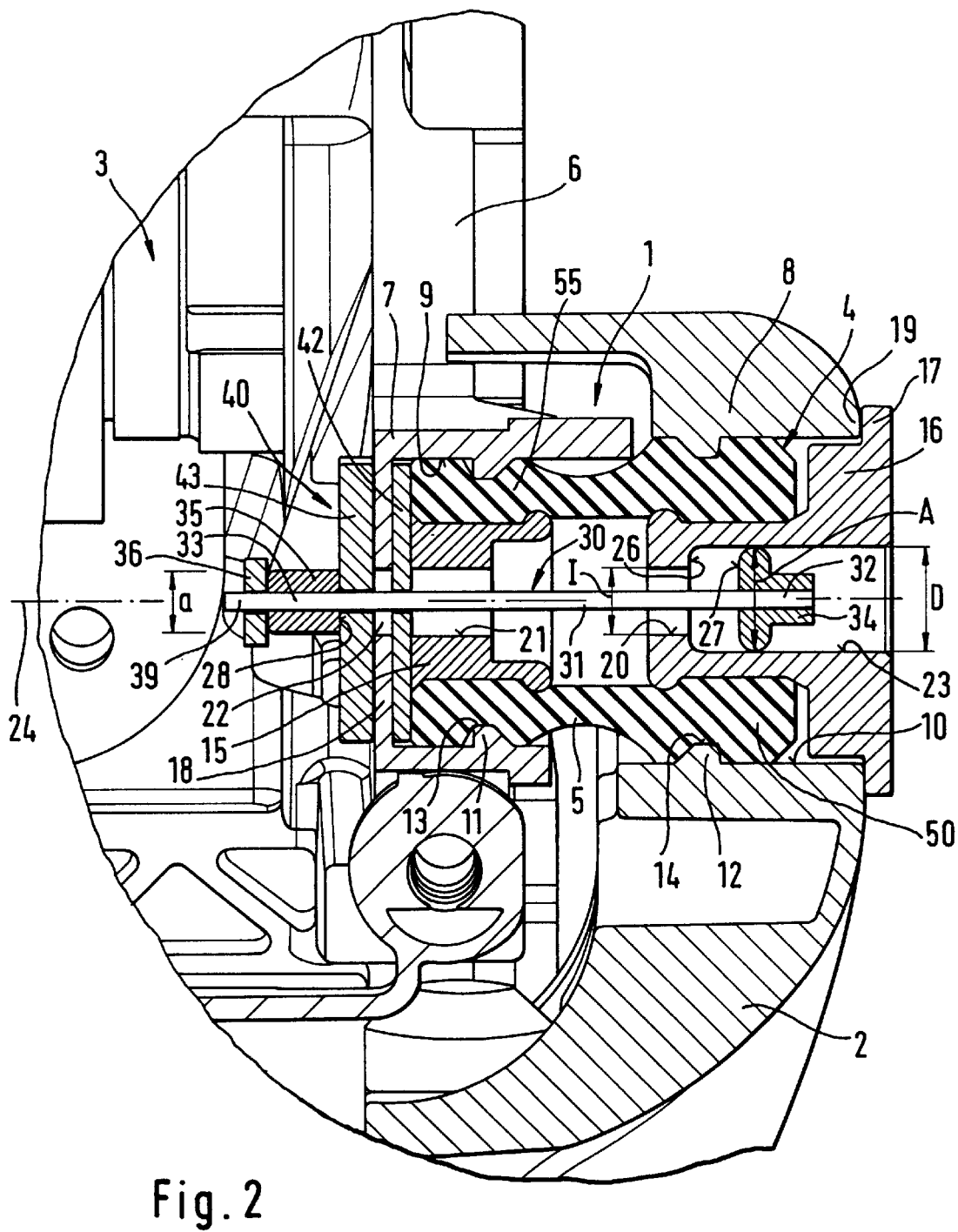
FIG. 2 is a cross-sectional view taken along the line II—II in FIG. 1.
Figure 3:
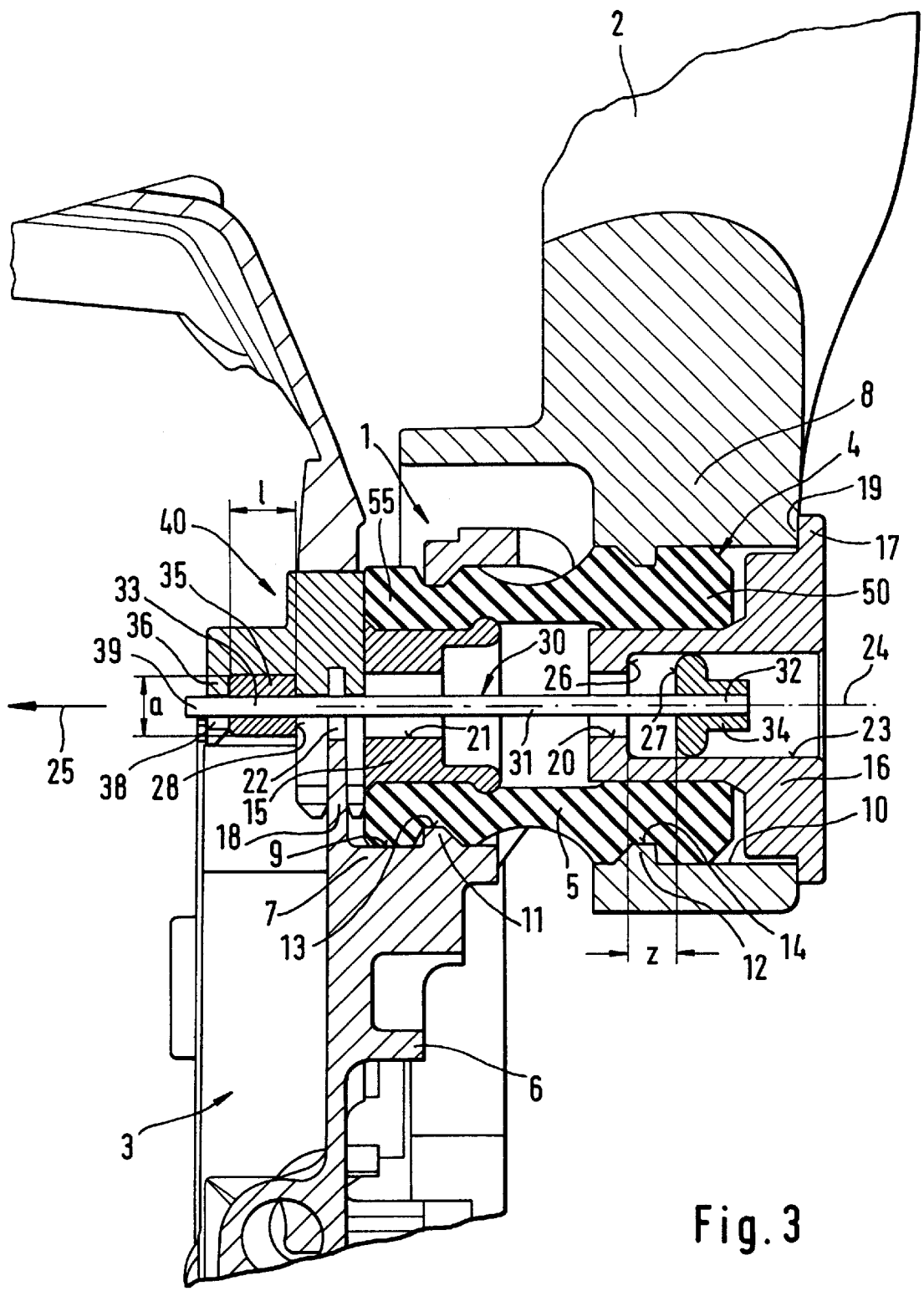
FIG. 3 is a cross-sectional view similar to that of FIG. 2 but taken in a plane rotated by 90°.

As shown in FIGS. 2 and 3, the plugs 15 and 16 have central through bores 20 and 21, which are disposed coaxially and have the same inner diameter I. Provided in the housing wall 18 is an aperture 22 that is aligned with the through bores 20 and 21 and that preferably has the same dimensions as do these through bores, although the aperture 22 can also expediently be larger.

The distance between the plugs 15 and 16 is spanned by a mechanical coupling element 30 that in the illustrated embodiment is embodied as a cable, especially a shear resistant cable 31 that is rigid for pushing purposes. A steel cable, especially a V2A steel cable, is expediently provided for this purpose.

In the vicinity of each of its ends 32 and 33 the cable 31 carries a respective nipple or fitting 34 and 35, each of which is preferably formed from a pressed-on sleeve made in particular of steel or brass.

In the illustrated installed position of the steel cable 31, which is utilized as security against separation, the first fitting 34 is disposed within the first plug 16 with slight radial play in a cylindrical receiving section 23 that is coaxial to the through bore 20. The essentially cylindrical fittings 34 and 35 have different outer diameters. In particular, the outer diameter "a" of the second fitting 35 is less than the maximum outer diameter A of the first fitting 34. In this connection, the inner diameter I of the through bores 20 and 21 is slightly greater than the outer diameter a of the second fitting 35, whereas the inner diameter D of the cylindrical receiving section 23 is greater than the inner diameter I of the through bores 20 and 21 and corresponds approximately to the maximum outer diameter A of the first fitting 34. In this connection, the first fitting 34 is held with slight radial play in the receiving section or means 23, whereby the first fitting 34 is rounded in the axial direction in an arched, circular or spherical manner so that if the cable 31 moves in a transverse direction, a binding of the fitting 34 in the receiving section 23 is prevented.

To assemble the coupling element or separation securement means 30, the shear resistant cable 31, which is provided with the fittings 34 and 35, is inserted, with the first, smaller fitting 35 having the diameter "a" leading, through the plugs 15 and 16 and through the aperture 22 in the housing wall 18. In the installed position, the fitting 35 is disposed on that side of the housing wall 18 that is remote from the anti-vibration element 1, and is held in this position by a bracket or clip 40. This clip, which is illustrated in detail in FIGS. 4 to 6, essentially comprises a U-shaped main body 41, the legs 42 and 43 of which define a receiving slot 44 for the edge of the housing wall 18. As can be seen in particular from FIG. 5, there is provided in the legs 42 and 43 a transverse slot 45 that extends in the longitudinal direction of the legs and forms a receiving slot that is intended for the cable body and is disposed transverse to the receiving slot 44 for the edge of the housing wall 18.

Figure 4:
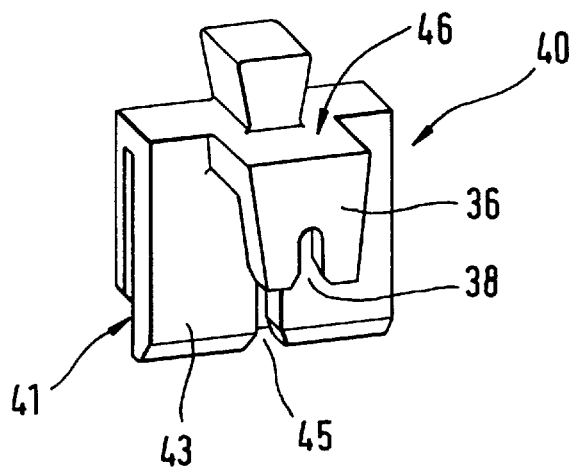
FIG. 4 is a perspective view of one exemplary embodiment of a clip.
Figure 5:
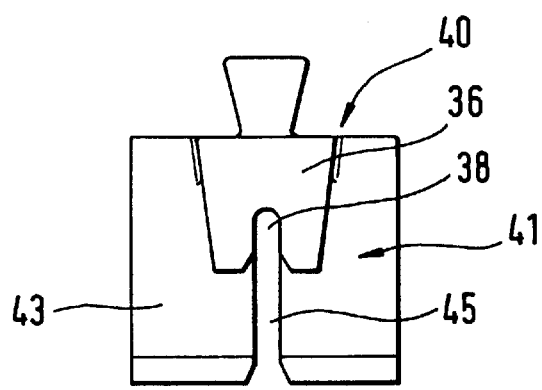
FIG. 5 is a front view of the clip of FIG. 4.
Figure 6:
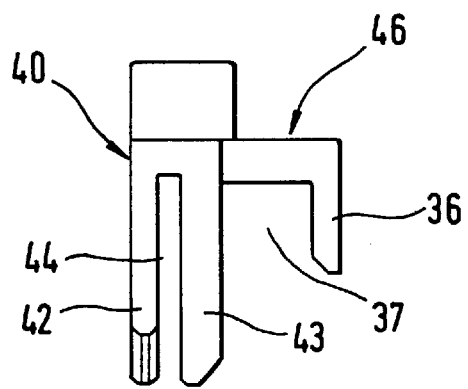
FIG. 6 is a side view of the clip of FIG. 4.

As can be seen further in FIGS. 4 to 6, the clip 40 is provided with an outer, L-shaped bracket 46 that adjoins the base region of the leg 43 that forms an outer wall of the clip. Between the free leg 36 of the bracket 46, which is parallel to the leg 43, and the leg 43 of the main body 41, there is delimited a free space 37 that serves for receiving the fitting 35. The spacing between the leg 36 and the leg 43 therefore corresponds to the axial length "l" (FIG. 3) of the cylindrical fitting 35. As shown in FIGS. 4 and 5, a slot 38 is provided in the free leg 36 of the L-shaped bracket 46 that is aligned with the transverse slot 45 and serves for receiving an end 39 of the cable 31 that extends out of the fitting 35.

After the shear resistant cable 31 is inserted through the anti-vibration element 1 in the direction of the arrow 25 (FIG. 3), the fitting 35 is positively fixed in position on the housing wall 18 of the motor unit 3. For this purpose, the clip 40 is pressed onto the edge of the housing wall 18, which enters the slot 44 of the clip 40; at the same time, the body of the cable 31 is disposed in the transverse slot 45, so that the fitting 35 is held in the free space 37 between the legs 36 and 43 of the clip 40. This is enhanced in that the end 39 of the cable enters the slot 38 of the leg 36 of the L-shaped bracket 46. In this way, the fitting 35, and hence the shear resistant cable 31, are held in such a way that they cannot shift axially, thus achieving a coaxial orientation of the cable 31 with the longitudinal central axis 24 of the anti-vibration element 1.

The fitting 34 that is disposed in the plug 16 is centered by the inner wall of the cylindrical receiving section 23, as a consequence of which the cable 31 is also centrally disposed in the through bore 20 of the plug 16.

As a result of the diameter relationship, an annular shoulder 26 is formed between the through bore 20 and the inner wall of the cylindrical receiving section 23, with this shoulder 26 being disposed across from the facing end face 27 of the second fitting 34. The length of the cable 31 is such that the end face 27 is spaced from the annular shoulder 26 in the illustrated installed position by a distance "z" (FIG. 3) during operation of the implement.

As a result of the assembled position of the cable 31 being secured by the clip 40, each of the fittings 34 and 35 axially positively engages an edge of the component associated with that fitting. For example, the fitting 34, due to the fact that its outer diameter A is greater than the through bore 20, engages from behind the annular shoulder 26 in the plug 16, which is mechanically supported against the handle unit 2 via the annular flange 17. The annular shoulder 26 is thus functionally an edge or rim of the handle unit 2.

The fitting 35 is non-detachably held on the housing wall 18 by the clip 40, whereby the end face 28 of the fitting 35 is supported against the leg 43 of the clip 40, a large surface of which in turn is supported against the facing side of the housing wall 18. The fitting 35 thus axially positively engages from behind the edge or rim of the housing wall 18 of the motor unit 3.

Since the length of the cable 31 is greater than the spacing of the edges of the components 2 and 3 that are engaged between the fittings, and since furthermore the cable 31 is disposed with great radial play in the through bores 20 and 22, a transmission of vibrations from the motor unit 3 to the handle unit 2 via the cable 31 is to a large extent precluded. In particular, the separation securement ensures the entire functionality of the elastic vibration dampener or damper 4. The securement against separation is ensured not only in the axial direction due to the spacing "z" between the fitting 34 and the annular shoulder 26, but also in the transverse direction due to the central positioning of the cable 31 in the through bores 20 and 21 during normal operation without a vibration-transmitting connection of the motor unit 3 to the handle unit 2. If the elastic vibration dampener or damper 4, i.e. the main body 5, is destroyed by an improper effective force, the rigid cable 31 continues to ensure the connection between the handle unit 2 and the motor unit 3.

Figure 7:
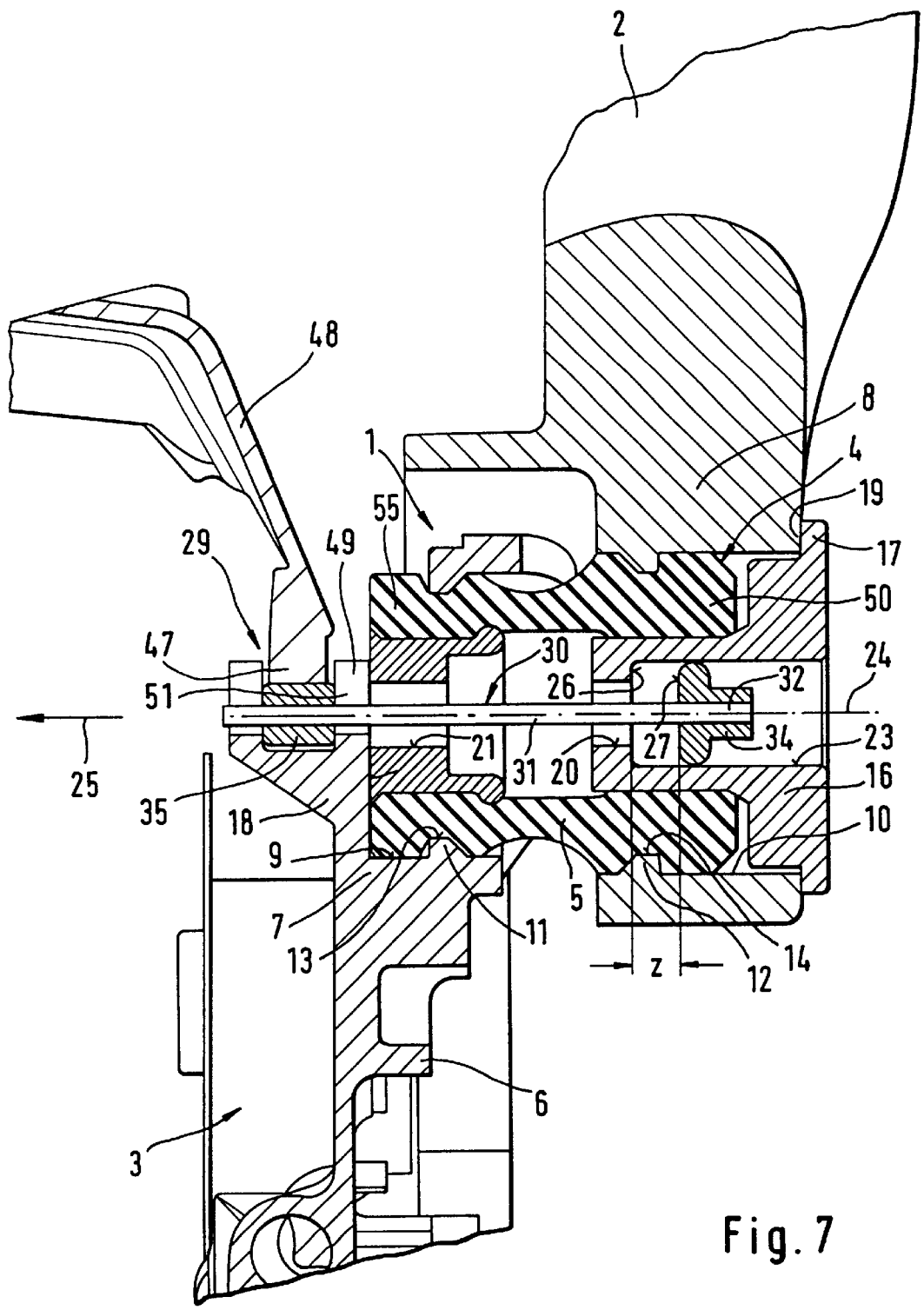
FIG. 7 is a cross-sectional view of another exemplary embodiment of an inventive anti-vibration element between a handle unit and a motor or housing unit and having a fitting held in a receiving means of the motor unit.

FIG. 7 illustrates an alternative mounting of the fitting 35 on the housing wall 18 of the motor unit 3, i.e. the motor housing 6 thereof. Formed on the motor housing 6 is a pocket-shaped receiving means 29 in which the fitting 35 is placed in such a way that, pursuant to the invention, it axially positively engages a rim or edge 49 of the receiving means 29 from behind. The rim 49 is provided with a slot 51 for the coupling element 30, i.e. the cable 31; since the fitting 35 has a diameter that is greater than the width of the slot 51, the fitting 35 is supported axially against the rim 49. In order to secure the fitting 35 in the receiving means 29, a rib or member 47 of a detachable housing cover 48 closes off the receiving means 29; for this purpose, the member 47 preferably extends into the receiving means 29, as shown in FIG. 7. The receiving means 29 can be provided in a cast part of the motor unit 3 or housing 6 thereof.

The specification incorporates by reference the disclosure of German priority documents 199 35 609.2 of Aug. 3, 1999 and 199 55 931.7 of Nov. 20, 1999.

The present invention is, of course, in no way restricted to the specific disclosure of the specification and drawings, but also encompasses any modifications within the scope of the appended claims.

What we claim is:

1. An anti-vibration element for disposition between a motor unit and a handle unit of a manually guided implement, said anti-vibration element comprising:
   a sleeve-shaped, elastic main body, as a vibration damper, wherein a first end portion of said main body is adapted to be disposed in a receiving means of a motor unit, and a second end portion of said main body is adapted to be disposed in a receiving means of a handle unit;
   respective plugs disposed in said end portions of said main body for non-detachably holding said end portions in said receiving means; and
   a cable that serves as a coupling element for preventing separation of said plugs, wherein said cable spans an axial spacing between said plugs and extends through said main body, wherein said cable has two end regions, each of which is provided with a respective fitting, and wherein an axially inwardly facing end face of each of said fittings, positively engages behind an edge of an adjacent one of said handle unit and said motor unit.

2. An anti-vibration element according to claim 1, wherein said cable has a length that is greater than a spacing of said edges of said units that are engaged from behind and are disposed between said fittings.

3. An anti-vibration element according to claim 1, wherein said cable is an essentially shear resistant cable or one that is rigid for pushing.

4. An anti-vibration element according to claim 1, wherein said fittings have an essentially cylindrical shape and are disposed approximately coaxial to an axis of said cable, and wherein a maximum outer diameter of one of said fittings is greater than a maximum outer diameter the other of said fittings.

5. An anti-vibration element according to claim 4, wherein said plugs have a preferably central through bore, an inner diameter of which is somewhat greater than said outer diameter of the other of said fittings.

6. An anti-vibration element according to claim 5, wherein said cable is oriented approximately centrally in said through bore of one of said plugs.

7. An anti-vibration element according to claim 4, wherein the other of said fittings having the smaller outer diameter is held in a receiving means of a wall of a housing of said motor unit.

8. An anti-vibration element according to claim 4, wherein a clip is provided for holding the other of said fittings having the smaller outer diameter positively on an edge of a wall of a housing of said motor unit.

9. An anti-vibration element according to claim 8, wherein said other of said fittings is held by said clip in such a way that it cannot be shifted axially.

10. An anti-vibration element according to claim 8, wherein said cable extends through said other fitting and is grasped by said clip.

11. An anti-vibration element according to claim 10, wherein said clip has a first U-shaped slot for receiving an edge of a wall section, and a second slot disposed transverse to said first slot for receiving a body of said cable.

12. An anti-vibration element according to claim 11, wherein said clip has an outer, L-shaped bracket and wherein a receiving space for the other of said fittings is formed between a leg of said bracket and an outer wall of said clip.

13. An anti-vibration element according to claim 12, wherein a spacing between said leg of said bracket and said clip wall corresponds approximately to an axial length of the other of said fittings.

14. An anti-vibration element according to claim 12, wherein said leg of said bracket is provided with a slot for receiving a cable end that extends out of the other of said fittings.

15. An anti-vibration element according to claim 1, wherein one of said fittings is disposed in a cylindrical receiving section of one of said plugs.

16. An anti-vibration element according to claim 15, wherein said one fitting is disposed with slight radial play in said receiving section.

17. An anti-vibration element according to claim 15, wherein said receiving section is disposed coaxial to a through bore of said one plug.

18. An anti-vibration element according to claim 15, wherein said one fitting, in an axial direction, is arched.

19. An anti-vibration element according to claim 1, wherein each of said fittings is a pressed-on sleeve that is made of steel or brass.

20. An anti-vibration element according to claim 1, wherein said cable is a steel cable of V2A steel.

* * * * *

UNITED STATES PATENT AND TRADEMARK OFFICE
CERTIFICATE OF CORRECTION

PATENT NO. : 6,412,180 B1
DATED : July 2, 2002
INVENTOR(S) : Wolf et al.

It is certified that error appears in the above-identified patent and that said Letters Patent is hereby corrected as shown below:

<u>Title page,</u>
Item [30], should read as follows:
-- [30] Foreign Application Priority Data

Aug. 3, 1999   (DE) ..........................199 35 609
      Nov. 20, 1999  (DE) ..........................199 55 931 --

Signed and Sealed this

Fifteenth Day of October, 2002

*Attest:*

JAMES E. ROGAN
*Attesting Officer    Director of the United States Patent and Trademark Office*